UNITED STATES PATENT OFFICE.

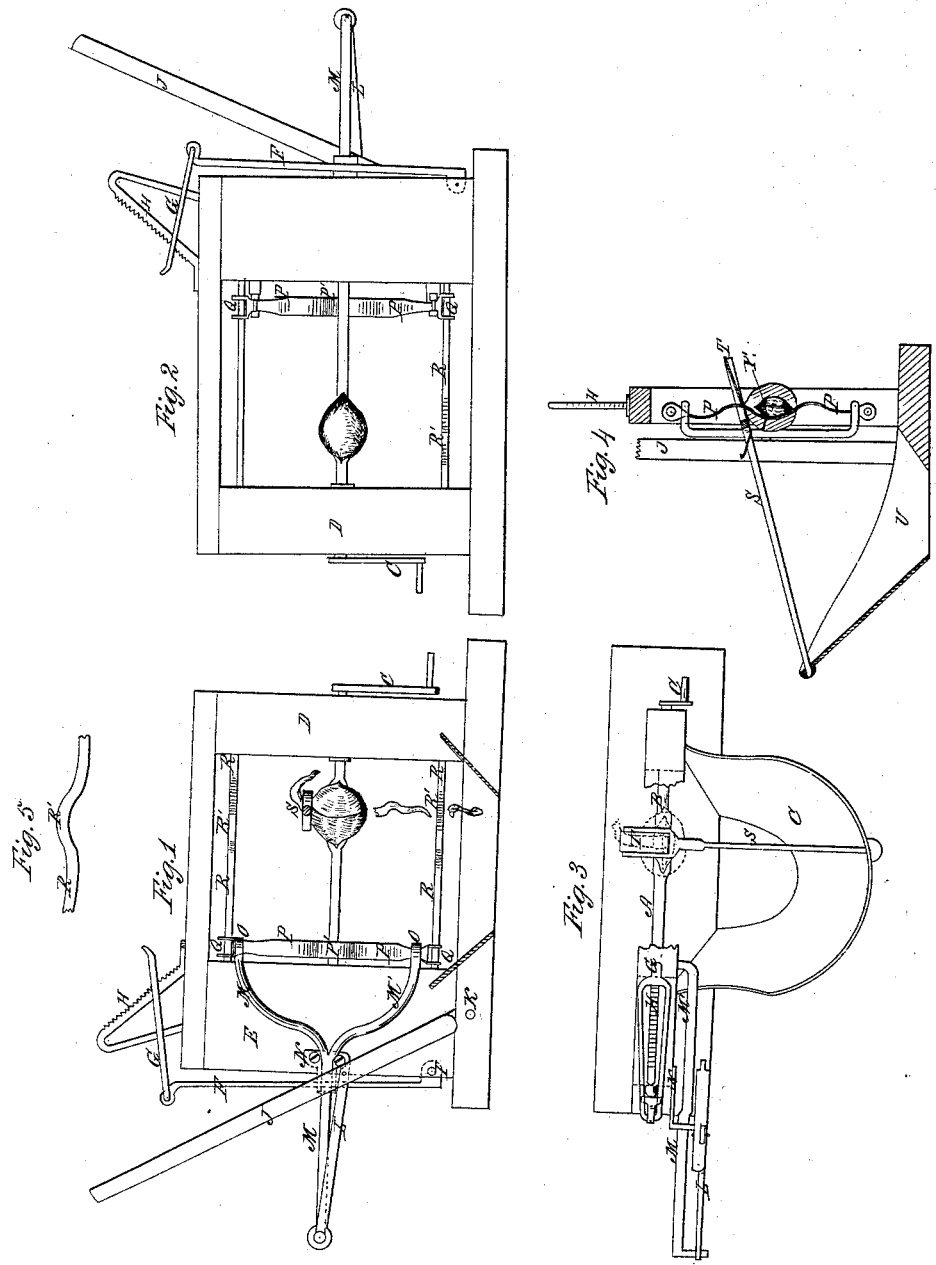

WESLEY A. COE, OF GREENSBORO, NORTH CAROLINA.

PEACH-PARER.

Specification of Letters Patent No. 30,527, dated October 30, 1860.

*To all whom it may concern:*

Be it known that I, WESLEY A. COE, of Greensboro, in the county of Guilford and State of North Carolina, have invented a new and useful Improvement in Peach-Paring Machines; and I do hereby declare that the following is a full, clear, and exact description of the same, reference being had to the accompanying drawings, forming a part of this specification, in which—

Figure 1, represents a front view. Fig. 2, a rear view. Fig. 3, a top view, and Fig. 4, a vertical cross section of the machine. Fig. 5, is a top view of the guide rods of the slicing knife.

Similar letters of reference, in each of the several figures indicate corresponding parts.

The nature of my invention consists, first, in the peculiar arrangement of the two prongs of a peach paring and slicing machine, and crank, in combination with a lever hinged at one end and hung to an oblique rack by a link, all constructed in the manner and for the purpose hereinafter set forth. It consists second, in a curved and elastic slicing knife and curved guide rods, in combination with a reciprocating stirrup, constructed and operating as hereinafter described.

To enable others, skilled in the art, to make and use my invention, I will proceed to describe its construction and operation.

The peach to be pared and sliced is held between the forked or pronged ends of two rods A, B. Both these rods have their bearings in the frame E, D, of the machine and can be revolved in their bearings by means of a crank C, attached to the outer end of rod B. This rod B, cannot yield in the direction of its axis, while the rod A, is free to slide longitudinally in its bearing. The outer end of rod A, bears against an upright lever F, the lower end of which is pivoted at I, while its upper end can be hung to an oblique rack H—projecting from the frame of the machine—by means of a link G. When the peach has been inserted between the two prongs, the prong A, is forced forward against the other prong—by pressing forward the upper end of lever F—until both prongs enter the peach and grasp the stone. The lever is then secured in its position by slipping the link G, over the oblique rack. It will be understood that the obliquity of the rack allows the lever to be secured in various positions so as to accommodate stones of various sizes. The peach being thus held between the prongs, it can be turned by operating the crank C, so as to expose one side after the other to the action of the slicing knife P, P′, P.

An oblique paring knife T, is secured between the forked end of a rod S, which latter slides through a hole near the upper edge of a hopper U, attached to the frame of the machine. This rod being moved forward into the position represented in Fig. 4, and the paring knife being laid on the surface of the peach, the peach may be revolved—by operating crank C—against the edge of the paring knife, by which means the paring operation will be performed. It will be understood that the operator must guide the paring knife all over the surface of the peach. After the peach has been properly pared, the paring knife is withdrawn and the slicing knife P, P′, P, is operated so as to cut the peach in two halves and separate them from the stone. This slicing knife is curved at P′, so as to adapt itself to the stone, as represented in Fig. 4, and it is made thin enough to yield sufficiently to adapt itself to various sizes of stone. This knife is provided with a pair of perforated flanges Q, at its upper and lower end. A stationary horizontal guide rod R, extends through the perforations of each pair of flanges, so that the knife can be moved to and fro on said guide rods. That part of each of the two guide rods which is in a vertical line with the peach stone, is curved out, as seen at R′, in order that the knife as it passes along the curved portions of the guide rods, shall pass around the stone.

Before the slicing knife is moved forward, the peach is turned by means of crank C, so that the smaller diameter of the stone shall be horizontal, as seen in Fig. 4, and thus the knife P, P′, P, is moved forward so as to cut off one half of the peach. When the knife has passed through the peach, the latter is turned 180° by the crank C, so as to expose the other half of the peach to the action of the slicing knife while being moved back to its original position.

The knife is operated backward and forward, by means of a hand-lever J, fulcrumed at K. The outer end of a rod M, moving horizontally in a bearing N, is hung to the lever J, by a connecting rod L. The inner end of rod M, is made in the shape of a stirrup M', M'. Each end of the stirrup embraces one end of the slicing knife, as seen at O, O, so that the knife is free to turn on its own vertical axis, when passing along the curved parts R', of the guide rods.

This is a very simple and effective machine for paring and slicing peaches.

What I claim as my invention, and desire to secure by Letters Patent, is—

1. The peculiar arrangement of the two prongs A, B, of a peach paring and slicing machine and crank C, in combination with a lever F, hinged at one end—at I—and hung to an oblique rack H, by a link G, all constructed substantially as and for the purposes set forth.

2. A curved and elastic slicing knife P, P', P, and curved guide rods R, R', R, R, R', R, in combination with a reciprocating stirrup M, M', M, constructed and operating substantially as set forth.

The above specification of my impt. in peach parers signed by me this 25th day of September 1860.

WESLEY A. COE.

Witnesses:
JOHN F. HOWLETT,
L. M. SCOTT.